June 14, 1966 R. D. HOMAN 3,255,863
PACKAGE SEPARATOR
Filed Jan. 21, 1964 4 Sheets-Sheet 1
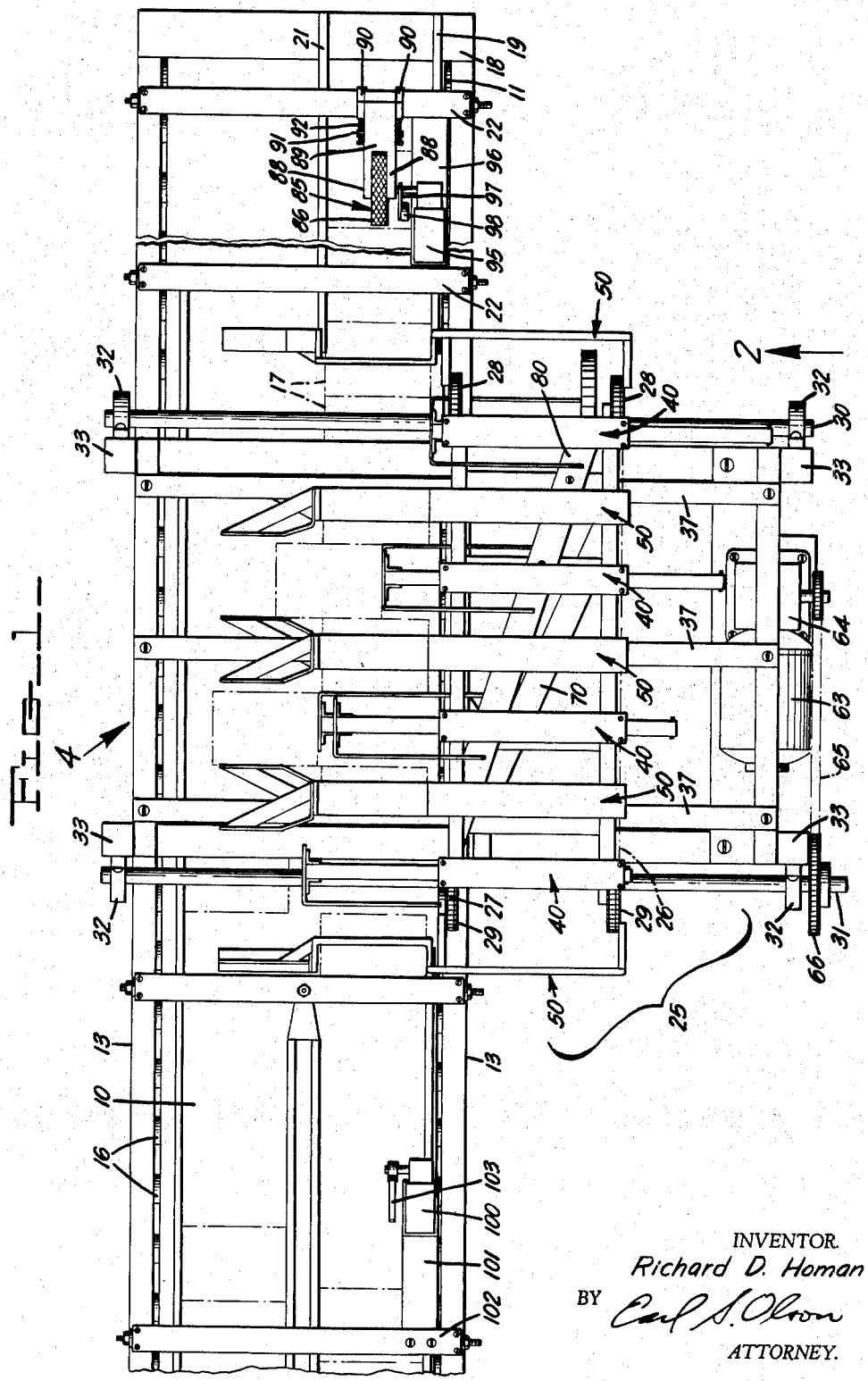
INVENTOR.
Richard D. Homan
BY
ATTORNEY.

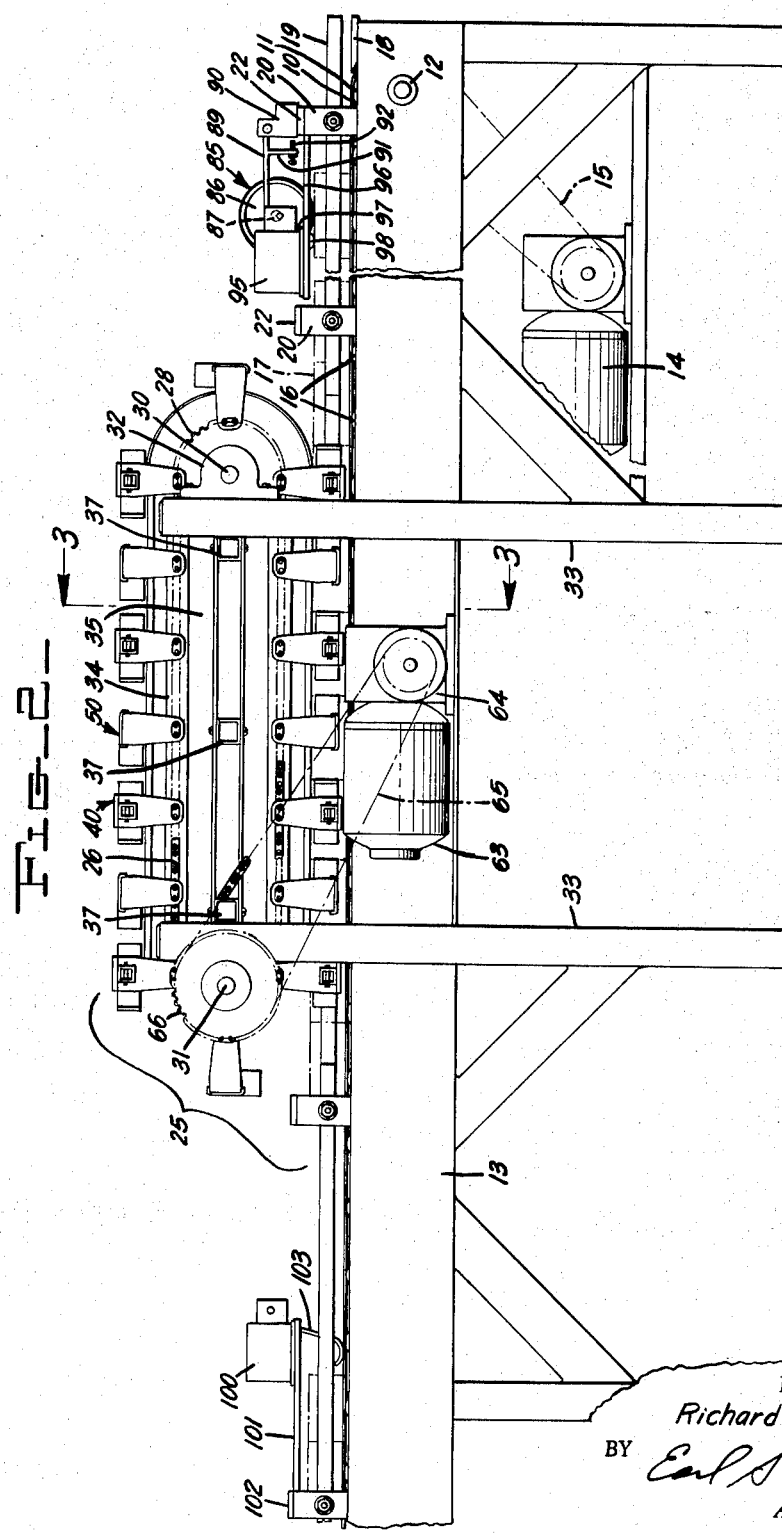

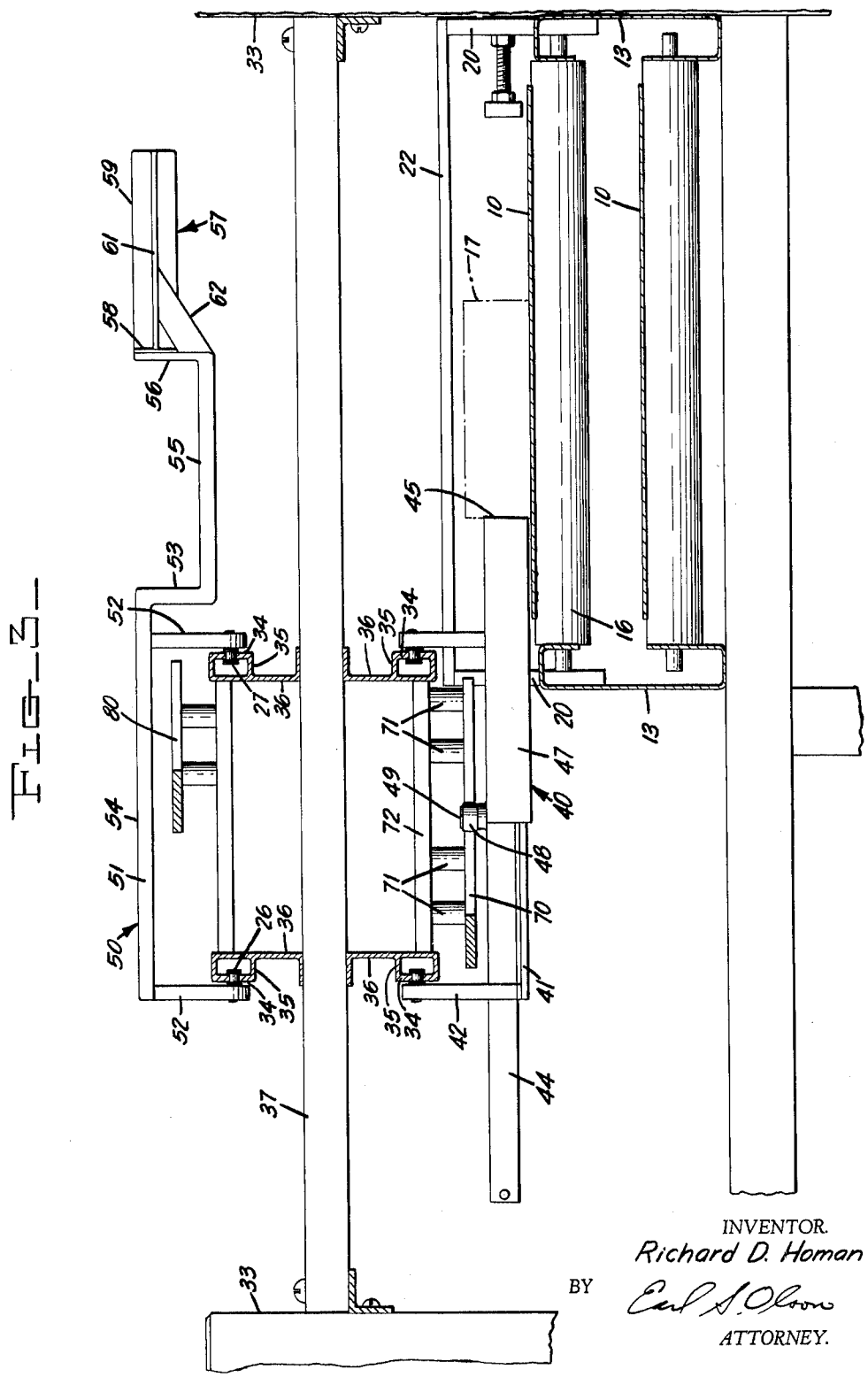

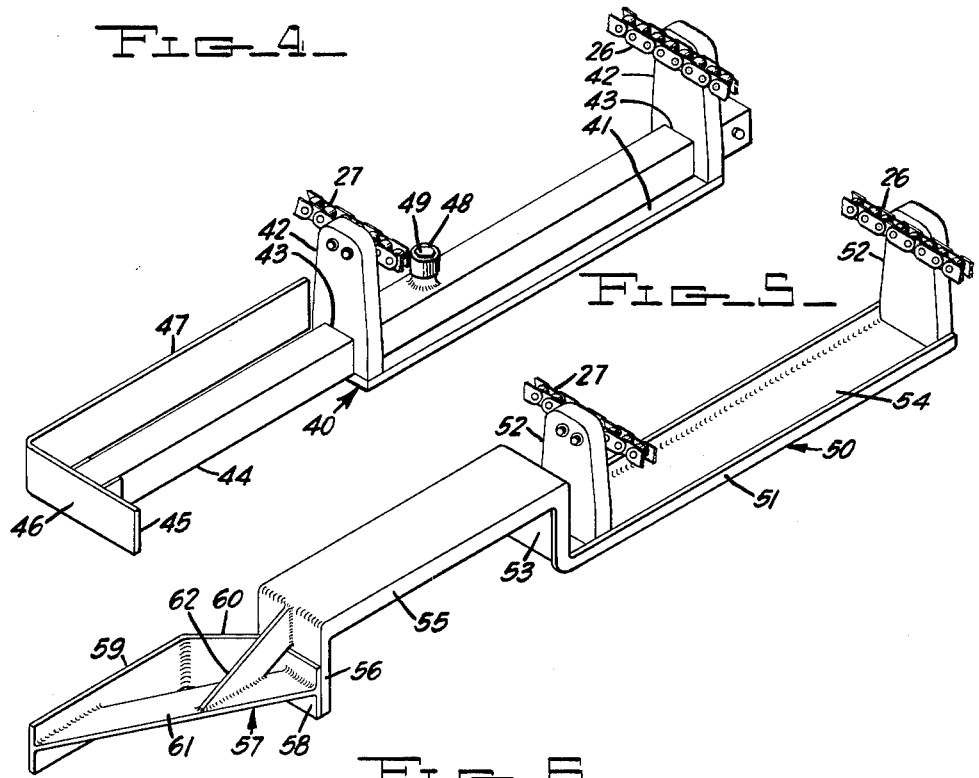

United States Patent Office 3,255,863
Patented June 14, 1966

3,255,863
PACKAGE SEPARATOR
Richard D. Homan, Terre Hill, Pa., assignor to Textile Machine Works, Wyomissing, Pa., a corporation of Pennsylvania
Filed Jan. 21, 1964, Ser. No. 339,174
12 Claims. (Cl. 198—31)

The instant invention relates to apparatus for operating on a succession of articles, delivered to the apparatus in single file, to separate them into multiple files. The invention is particularly useful in the packaging field, for example where packages to be encased are received from a previous operation in a single file and multiple files are required for the case loading operation and will be described in that connection. It will be understood however that the invention may have other fields of use and also while the term "packages" is hereafter used the term is not to be construed in a limiting sense but to include any objects susceptible of being handled by the apparatus.

The principal object of the invention is the provision of an improved separating apparatus of the above mentioned type. More particularly an object of the invention is the provision of such apparatus comprising a conveyor to which the packages are delivered in single file and means cooperating with said conveyor to shift spaced packages of the single file, for example alternate packages, laterally of the conveyor to form a second file.

Another object of the invention is the provision of an apparatus attaining the foregoing objects including means to guide the packages during their shifting movement.

Another object of the invention is the provision of such apparatus including means to discontinue the operation of the shifting means and of the travel of the packages being acted on by the shifting means in the event of interruptions in the single file supply thereof and in the event the packages are, following the shifting operation, "backed up" from the loading operation or otherwise prevented from moving with the conveyor.

Briefly described my invention resides in a separating apparatus comprising an endless, continuously traveling conveyor in combination with a package shifting means comprising a series of spaced pusher members carried by conveying means supported laterally adjacent the conveyor. Intermediate the pusher means and also carried by the conveying means are guide members adapted to guide or control the shifting movement of the packages. The packages are introduced to the conveyor in a single file or line and as they are carried by the conveyor the pusher members contact spaced packages, such as alternate packages, and push them laterally of the conveyor to form a second file, the guide members during such shifting movement serving to control the movement of the packages and at the same time to act as hold-backs to prevent intermediate packages which remain in the original file from moving with the shifted packages by reason of the frictional contact therebetween. The device may include a control circuit for the drive of the pusher member conveying means, said circuit including a switch having a switch arm, to be contacted by the packages as they approach the pusher means in single file, adapted to open the circuit to the driving motor of the conveyor means in the event of undue interruption in the single file supply line. Further such control circuit may include a switch having a switch arm adapted to contact the packages of one file following the operation of the pusher means and open the circuit to the drive of the conveying means in the event that the packages "back up" from the loading means or other device to which they are delivered by the conveyor.

The invention will be more fully understood and further objects and advantages thereof will become apparent when reference is made to the more detailed description thereof which is to follow and to the accompanying drawings in which:

FIG. 1 is a top plan view of an apparatus in accordance with the instant invention;

FIG. 2 is a side elevational view of the apparatus of FIG. 1 looking in the direction of the arrow 2 of FIG. 1;

FIG. 3 is a sectional view on an enlarged scale taken on line and in the direction of the arrows 3—3 of FIG. 2;

FIG. 4 is a perspective view on an enlarged scale of a pusher member and its supporting means as employed in the apparatus of FIG. 1 looking in the direction of the arrow 4 of FIG. 1;

FIG. 5 is a perspective view on an enlarged scale of a guide means and its supporting means as employed in the apparatus of FIG. 1 looking in the direction of the arrow 4 of FIG. 1; and FIG. 6 is a diagrammatic plan view illustrating the operation of the apparatus of the invention.

Referring now to the drawings and particularly to FIGS. 1, 2 and 3 the apparaus of the instant invention comprises an endless conveyor belt 10 supported on rollers 11 one of which is shown at the right of FIG. 2, the rollers being supported on shafts mounted in bearings 12 carried by side frame members 13. The conveyor is driven for continuous running during the operation of the apparatus as by motor 14 and sprocket chain 15 connecting sprockets on the shaft of the motor, or of a speed reduction unit driven by the motor, and the shaft of one of the conveyor rollers 11. The upper run of the conveyor is suitably supported in a given plane by relatively closely spaced freely rotatable rollers 16 journaled in the frame members 13. The conveyor belt is of a width somewhat in excess of that required to accommodate a plurality, two in the device illustrated, of files of the packages 17 to be handled. The packages are delivered to the conveyor at the right hand end and adjacent the near edge of the conveyor, as viewed in FIG. 2, over a dead plate 18 in single file by hand or any suitable means. A fence 19 is mounted adjacent the edge of the conveyor on posts 20 and a second fence 21 is adjustably supported from cross-frame members 22 in spaced parallel relationship to the fence 19, the fences defining a lane of travel for the single file of packages as they approach the package separating zone now to be described, the fences terminating adjacent the separating zone.

A conveying means indicated generally at 25 is mounted laterally of the conveyor 10, the conveying means comprising continuous sprocket chains 26 and 27 carried by sprockets 28 and 29 mounted for rotation with shafts 30 and 31, respectively. The ends of the shafts are carried in bearings 32 supported by posts 33 at opposite sides of the conveyor 10, the posts forming a portion of a frame structure extending transversely over the conveyor. Referring particularly to FIG. 3 the upper and lower runs of the sprocket chains are guided in longitudinally extending ways 34 in the form of fabricated channels 35 supported by angle members 36 secured to frame members 37 forming a portion of the transversely extending frame structure.

Pusher members 40 are carried by links of the chains 26 and 27 to be driven therewith, the pusher members being spaced longitudinally of the chains at intervals corresponding approximately to the width of two of the packages to be handled by the apparatus. Referring to FIG. 4 where one of the pusher members is illustrated in detail and in the position which it assumes in the lower run of the conveying means 25, the pusher member comprises a bracket 41 including right angularly projecting end members 42 each of which is fixed to one of the links of a sprocket chain for conveyance therewith. End members 42 have aligned openings 43 receiving a rod 44 suitably square in cross section the aligned openings being of similar shape to the rod and dimensioned to permit longitudinal sliding movement but not rotation of the rod. An end of rod 44 which extends beyond end member 42 in a position to overlie conveyor 10 carries a pusher element 45 comprising a pusher plate 46 lying in a plane parallel to the vertical plane defining the longitudinal edge of the conveyor 10 and comprising a rearwardly extending right angle flange portion 47 of a length approximately equal to the side of a package extending transversely of the conveyor. End members 42 are so dimensioned that the lower edge of pusher element 45 will be in a horizontal plane slightly above the upper run of conveyor 10. A roller or follower 48 is mounted for rotation on a pin 49 projecting from rod 44 intermediate end members 42, the roller or follower being adapted for cooperation with camming members as will hereinafter be described.

Guide members 50 are carried by the chains 26 and 27, the guide devices being secured to chain links substantially midway between the links supporting adjacent pusher members 40. Refering particularly to FIG. 5, where one of the guide members is illustrated in detail and in the position which it assumes in the lower run of the conveying means 25, the member comprises a bracket 51 including a channeled base 54 and right angularly projecting members 52. Base 54 extends past the forward member 52 and is provided with an upwardly extending flange 53 lying in the approximate vertical plane of the longitudinal edge of the conveyor 10, a forwardly extending horizontal portion 55 and a downwardly projecting flange 56. Horizontal portion 55 is of a length to project transversely of the conveyor for a distance somewhat greater than the length of the side edge of a package to be handled by the apparatus and is spaced from the conveyor when carried by the lower run of the conveying means, a distance somewhat greater than the thickness of a package whereby a lane of packages may travel between flanges 53 and 56 and beneath portion 55. A guide element 57 is secured as by welding to flange 56. The guide element is substantially L-shaped and includes an arm 58 secured to the flange 56 as aforesaid and a forwardly extending arm 59 projecting transversely of the conveyor, arms 58 and 59 being connected by an angularly extending camming section 60 the function of which will be hereinafter described. Guide element 57 is suitably braced and additionally supported from flange 56 by webs 61 and 62 respectively.

Chains 26 and 27 are driven through their lower runs to travel in the same direction but at a somewhat slower speed than the upper run of conveyor 10. For example for a conveyor speed of eighty feet per minute the chains will be driven at seventy-two feet per minute. The driving means for the conveyor chains comprises a motor 63, a speed reduction unit 64, and a sprocket chain 65 connecting the output sprocket of the speed reduction unit with a sprocket 66 geared to an extended end of shaft 31 which carries chain sprockets 29.

Referring particularly to FIGS. 1, 3 and 6 a stationary camming member or bar 70 is supported by members 71 from transverse rods 72 suitably secured to channels 35 or other frame elements, the bar being in such position that it lies in the horizontal plane of the rollers 48 carried by the pusher members 40 during their travel with chains 26 and 27 through the lower run thereof. The profile of the forward or camming edge of bar 70 (see particularly FIG. 6) includes a relatively short riser 73 adapted to advance the pusher members from an initial fully retracted position to a position substantially in contact with the packages of the single file thereof as they are introduced to the separating apparatus, and a dwell 74. The camming edge further includes an extended riser 75, a reverse slope 76 and a dwell 77. A cooperating cam member 78 is mounted similarly to bar 70 opposite that portion of bar 70 which includes the higher part of riser 75, reverse slope 76 and dwell 77, the cooperating cam member and bar defining a closed cam track 79. As will be understood as the pusher members are carried with the lower runs of the chains of the conveying means they are first moved transversely of the conveyor to a position to contact the packages and then after a short rest period are moved up riser 75 to advance the packages into a second file position. Thereafter cam 78 causes the pusher members to move rearwardly out of contact with the packages and thereafter to continue without further advancement or retraction for the remainder of their travel with the lower run of the chains. A return camming member or bar 80 is mounted similarly to bar 70 but above the upper run of the chains in a position and at a level to contact followers 48 on the side thereof opposite that contacted by bar 70 as the pusher members are carried by the chains in the upper run thereof. Camming member 80 serves to retract the pusher members to the position illustrated at the right in FIG. 6 in preparation for advancement through their package separating operation.

As previously stated the packages are delivered to conveyor 10 in single file between fences 19 and 21. A holddown device 85 (see FIGS. 1 and 2) is provided adjacent the infeed end of the conveyor to prevent possible slippage between the packages and the conveyor to insure, assuming the adequacy of delivery to the conveyor, that the packages will be continuously positioned for operation thereon by the separating apparatus. The holddown device comprises a wheel 86 of substantial mass mounted above the package file for free rotation on an axle 87 carried in ears 88 of an arm 89 pivotally mounted on brackets 90 supported by one of the cross-frame members 22. Arm 89 includes a downwardly extending flange 91 in which is threaded an adjusting screw 92 adapted to bear against a portion of bracket 90 to limit the downward movement of the arm 89 and wheel 86 when no package is below the wheel. A micro-switch 95 is supported above the package file on a shelf 96 carried by the above mentioned cross-frame member 22. The micro-switch includes an actuating arm 97 supporting a roller 98 adapted to normally ride upon the upper surface of the packages in the single file but to swing downwardly in the absence of a package. Micro-switch 95 is of a conventional commercial type and is closed when the arm 97 is lifted by a package and opened upon downward movement of the arm in the absence of a package. The micro-switch is connected into the power circuit of driving motor 63 for the conveying means through a time delay relay for a purpose hereinafter explained.

A second micro-switch 100 is mounted adjacent the delivery end of conveyor 10 and above the line of the orignal package file on a shelf 101 secured to a cross-frame member 102. The micro-switch which is of a conventional commercial type includes an operating arm 103 positioned to be contacted by the packages which remain in the original file following the operation of the pusher means and to open the switch when so elevated by the package. Micro-switch 100 is also connected into the power circuit of the driving motor 63 through a time delay relay for a purpose hereinafter pointed out.

At the start of the operation of the apparatus described above the circuit to the conveyor motor 14 is closed to initiate continuous running of conveyor 10 and packages are supplied to the conveyor, either manually or by a feed conveyor as desired, in single file between fences 19 and 21. At this time the conveying means for the pusher members is inoperative due to open micro-switch 95. As the single file of packages is moved forwardly by the conveyor the leading package passes beneath hold-down device 85 and micro-switch 95 and elevates arm 97 to close the circuit to motor 63 and initiate the drive of the conveying means. As will be understood micro-switch 100 is also closed at this time as its arm 103 is in its down position. As the packages continue to move forwardly in single file the forward package will be brought into contact with the flange 47 of a partially advanced pusher member 40 adjacent the infeed end of the separating apparatus and thereafter will continue its forward movement but at the reduced speed of the conveying means. While the leading package may tend to turn or cant due to the fact that it is initially only in partial contact with the flange 47 this will not adversely affect the operation as the package will again be brought into alignment transversely of the conveyor as the pusher continues to advance. The setting of the time delay relay of switch 95 is such that the switch will remain closed and circuit to motor 63 energized only so long as the packages are supplied at such rate that the packages are in abutting or substantially abutting relationship as they reach the separating apparatus. Inasmuch as the pusher members are spaced to contact alternate packages, as the file of packages travels into the separating apparatus with the leading package in contact with the flange 47 of one of the pusher members the second and alternate packages thereafter will each be positioned opposite a pusher plate 46. Upon the continued operation of the separating apparatus the pusher plate 46 of each pusher member 40 will first move into contact with its associated package as the roller or follower of the pusher member follows the profile of camming bar 70. There will then be a short rest period, and thereafter the pusher member will gradually shift its associated package into a second file. The package is so positioned as the roller reaches the high point of riser 75. As the pusher device continues to travel it is moved away from the package and during its travel with the upper run of the chains is returned to its starting position by cam bar 80.

During the shifting of the packages from the initial original file into the second file they are guided by arms 59 of the guide members 50. In the event that a package, during the initial shifting movement thereof, tends to cant due to the higher speed movement of the conveyor as compared to the pusher member its leading outer corner will contact camming section 60 whereby the package will be again brought into proper transverse alignment. The packages intermediate the shifted packages will continue in the original file. Any tendency toward lateral movement by reason of frictional contact with the packages being shifted is overcome by the forward flanges 56 of the guide members which lie opposite them. Also the packages intermediate the shifted packages are restrained for forward travel at the speed of the conveying means by the flanges 47 of the pusher members ahead of them.

In the event that there is an interruption in the supply of packages which is longer than the interval permitted by the time delay relay associated with micro-switch 95 the switch will be open to stop the operation of the conveying means and hence of the pusher members until this condition is corrected. As will be recognized the time delay relay will be set dependent upon the relative speeds of the conveyor and conveying means, so that the switch will be opened whenever the interval between packages is such that a continuous file of packages is not delivered to the separator apparatus.

Micro-switch 100 and its controlling arm 103 is employed to prevent injury to the packages or to the apparatus in the event that the packages, after passing through the separating apparatus, cannot continue to move forwardly due to a tie-up at the loading apparatus or other device to which the packages are delivered by conveyor 10. For this purpose micro-switch 100 as previously explained is connected into the circuit of driving motor 63 through a time delay relay and is of the type which is opened when its actuating arm 103 is elevated for an interval greater than that for which the time delay relay is set. As will be understood when the packages left in the original file are advanced beyond the separating zone by conveyor 10 into the vicinity of micro-switch 100 they will normally be spaced apart a distance approximately that, or due to the higher speed of the conveyor as compared to the conveying means slightly greater than, the width of a package. The time delay relay associated with switch 100 is set so that the switch is not opened if arm 103 is raised only for the interval required for the passage of a package at the speed of the conveyor. However the setting is such that if the packages cannot continue their travel but back up to form a continuous file of adjacent packages whereby arm 103 is retained in its switch opening position for a period greater than that required for the normal passage of a package the switch opens thereby opening the driving circuit of motor 63 and stopping operation of the separating apparatus. When the condition which caused the stoppage is corrected and the packages move from under arm 103 the arm drops to again close the motor circuit and operation of the separating apparatus is automatically resumed.

Having thus described the invention in rather complete detail it will be understood that these details need not be strictly adhered to, and that various changes and modifications may be made all falling within the scope of the invention as defined by the following claims.

What is claimed is:

1. An apparatus for dividing articles moving in a single file into a plurality of files comprising a conveyor to which said articles are supplied in single file for movement in a forward direction, an endless conveying means having a lower run parallel to and adjacent said conveyor and movable in said forward direction, means for driving said conveyor at a first speed, means for driving said conveying means at a second speed slower than said first speed, pusher members carried by said conveying means at spaced intervals therealong and each including a forward pusher plate for contact with alternate articles of said single file and a laterally extending flange for contact by intermediate articles of said single file, and means for moving said pusher members during the forward movement of the lower run of said conveying means from a first position to a second position transversely of said conveyor to form a second file of said alternate packages with said intermediate packages being held in contact with said flanges by the higher speed of said conveyor relatively to the speed of said conveying means.

2. An apparatus for dividing articles from a single file into multiple files comprising a conveyor for receiving said articles in a single file, means to drive said conveyor at a given speed, a plurality of spaced article pusher members, means supporting said pusher members for movement longitudinally of said conveyor and in the direction of travel thereof, means for projecting said pusher members during said longitudinal movement thereof from positions adjacent articles in said single file transversely of said conveyor whereby articles opposite said pusher members are moved from said single file to form a second file, and guide members intermediate said pusher members to guide said articles during movement thereof into said second file.

3. An apparatus for dividing articles from a single file into multiple files comprising a conveyor for receiving said articles in a single file, means to drive said conveyor at a given speed, a plurality of spaced article pusher members, an endless conveying means to which said pusher members are secured for movement therewith longitudinally of said conveyor and in the direction of travel thereof, means for driving said conveying means independent of the drive of said conveyor, means for projecting said pusher members during their longitudinal movement from positions adjacent articles in said single file transversely of said conveyor whereby articles opposite said pusher members are moved from said single file to form a second file, and guide members carried by said endless conveying means intermediate said pusher members to guide said articles during movement thereof into said second file.

4. An apparatus for dividing articles moving in a single file into a plurality of files comprising a conveyor to which said articles are supplied in a single file for movement in a forward direction, an endless conveying means having a lower run parallel to and adjacent said conveyor and movable in said forward direction, means for driving said conveying means at a second speed slower than said first speed, pusher members carried by slidable bars supported by said conveying means, means comprising fixed cams and cam followers carried by said slidable bars for moving said pusher members during the forward movement of the lower run of said conveying means from a first position to a second position transversely of said conveyor, means for returning said pusher members to said first position during their travel with the upper run of said conveying means comprising a second cam cooperating with said followers, and guide members carried by said conveying means for guiding articles pushed by said pusher members.

5. An apparatus for dividing articles moving in a single file into a plurality of files comprising a conveyor to which said articles are supplied in single file for movement in a forward direction, an endless conveying means having a lower run parallel to and adjacent said conveyor and movable in said forward direction, means for driving said conveyor at a first speed, means for driving said conveying means at a second speed slower than said first speed, pusher members carried by said conveying means at spaced intervals therealong, and means for moving said pusher members during the forward movement of the lower run of said conveying means from a first position to a second position transversely of said conveyor, said means for moving said pusher members transversely of said conveyor including means for partially retracting said pusher members following movement thereof to said second position.

6. An apparatus for dividing articles from a single file into multiple files comprising a conveyor for receiving said articles in a single file, means to drive said conveyor, an endless conveying means having a lower run substantially parallel to and adjacent said conveyor and movable in a forward direction, means for driving said conveyor means, pusher members independent of said conveyor and supported by said conveying means at spaced intervals therealong for movement therewith and for movement laterally of said conveyor, and means for moving said pusher members during their movement with the lower run of the conveyor from a first position to a second position laterally of the conveyor.

7. A machine as defined by claim 6 wherein said pusher members are carried by slidable bars supported by said conveying means and said means for moving said pusher members comprises fixed cams and cam followers carried by said slidable bars.

8. An apparatus as defined in claim 6 wherein there is means to discontinue said forward movement of said lower run of said conveying means upon substantial interruption of the infeed of said single file of articles and for resuming said forward movement of said conveying means upon resumption of the continuity of said infeed.

9. An apparatus as defined in claim 6 wherein each of said pusher members comprises a pusher plate for contact with an alternate article and an article restraining flange for contact by an intermediate article of said single file.

10. An apparatus as defined in claim 9 wherein said pusher plate and flange lie at right angles to each other with the pusher plate extending longitudinally of the conveyor.

11. An apparatus as defined in claim 6 wherein there are guide members carried by said conveying means between adjacent pusher members to guide articles pushed by said pusher members.

12. An apparatus as defined in claim 11 wherein each of said guide members includes a guide arm and a camming surface for leading misaligned packages to said guide arm.

References Cited by the Examiner
UNITED STATES PATENTS

| | | |
|---|---|---|
| 1,768,482 | 6/1930 | Koch. |
| 1,916,255 | 7/1933 | Cabot _____ 198—37 X |
| 2,493,942 | 1/1950 | Bingham. |
| 3,144,119 | 8/1964 | Nigrelli _____ 198—32 |
| 3,150,760 | 9/1964 | Nigrelli. |

FOREIGN PATENTS 255,425  1/1912  Germany.

References Cited by the Applicant
UNITED STATES PATENTS 2,966,251  12/1960  H. H. Nussbaum.

SAMUEL F. COLEMAN, *Primary Examiner.*

EDWARD A. SROKA, *Examiner.*